United States Patent
Basista et al.

(10) Patent No.: US 8,511,067 B2
(45) Date of Patent: Aug. 20, 2013

(54) EXHAUST GAS AFTERTREATMENT SYSTEM

(75) Inventors: Jeffrey S. Basista, Milford, MI (US); Philip A. Yaccarino, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 691 days.

(21) Appl. No.: 12/241,298

(22) Filed: Sep. 30, 2008

(65) Prior Publication Data

US 2010/0077740 A1    Apr. 1, 2010

(51) Int. Cl.
*F01N 3/08* (2006.01)
(52) U.S. Cl.
USPC .............................................. 60/286; 60/295
(58) Field of Classification Search
USPC ................ 60/286, 295, 301; 222/146.5, 318, 222/385; 239/5, 125, 127, 130, 132.1, 133
See application file for complete search history.

(56) References Cited

U.S. PATENT DOCUMENTS

| | | | | |
|---|---|---|---|---|
| 2,541,221 A | * | 2/1951 | Edwards | 366/264 |
| 3,638,860 A | * | 2/1972 | Carlyon, Jr. | 239/127 |
| 4,394,966 A | * | 7/1983 | Snyder et al. | 239/127 |
| 4,723,710 A | * | 2/1988 | Lucore, II | 239/124 |
| 6,857,774 B2 | * | 2/2005 | Kozyuk | 366/263 |
| 6,928,806 B2 | | 8/2005 | Tennison et al. | |
| 2002/0000481 A1 | * | 1/2002 | Utz et al. | 239/284.1 |
| 2007/0084193 A1 | * | 4/2007 | Levin | 60/283 |
| 2007/0137184 A1 | * | 6/2007 | Patchett et al. | 60/286 |

FOREIGN PATENT DOCUMENTS

CN        2358393 Y      1/2000
WO   WO2008040589 A1    4/2008

* cited by examiner

*Primary Examiner* — Thomas Denion
*Assistant Examiner* — Jorge Leon, Jr.
(74) *Attorney, Agent, or Firm* — Cantor Colburn LLP

(57) ABSTRACT

A reductant reservoir for an emission control system has a pump assembly with an intake adapted to withdraw reductant from the reservoir, a heating element associated with the pump assembly for heating reductant and an outlet for delivering heated reductant to the emission control system. A nozzle assembly ejects a portion of heated reductant into the reservoir to thaw frozen reductant.

9 Claims, 3 Drawing Sheets

EXHAUST GAS AFTERTREATMENT SYSTEM

BACKGROUND OF THE INVENTION

The present invention relates to an emission control system for diesel and other lean-burn engines and, more particularly to an improved reductant storage system. Current emission control regulations necessitate the use of catalysts in the exhaust systems of automotive vehicles in order to convert regulated exhaust constituents such as carbon monoxide (CO), hydrocarbons (HC) and oxides of nitrogen (NOx), produced during the operation of the engine, into unregulated exhaust gas.

Vehicles equipped with diesel and lean-burn gasoline engines can offer the benefit of increased fuel economy, however, the control of NOx emissions in such systems is challenging due to the high content of oxygen in the exhaust gas. Selective Catalytic Reduction (SCR) catalysts, in which NOx is continuously reduced to nitrogen ($N_2$) over a catalyst typically composed of base metals through active injection of a reductant, such as ammonia rich urea, into the exhaust gas mixture entering the catalyst, are known to achieve high NOx conversion efficiency.

In the systems described thus far, the ammonia rich urea is an aqueous solution which is stored in an aqueous urea reservoir in the vehicle and is delivered to an injector, located in the exhaust system of the vehicle, via fluid lines and a pump. The urea typically has a freezing temperature in the range of 12 degrees Fahrenheit, which may present winter challenges to the operation of the SCR system. Systems which include heating elements in a submersible pump module within the reservoir have been found to operate in a less than satisfactory manner as have resistor grid heating mats within the reservoir due to poor heat transfer throughout the fluid.

BRIEF DESCRIPTION OF THE INVENTION

The present invention is directed to an emission control system for diesel and other lean-burn engines and, more particularly to an improved reductant storage system. Selective Catalytic Reduction (SCR) catalysts, in which NOx is continuously reduced to nitrogen ($N_2$) over a catalyst typically composed of base metals, through active injection of a reductant such as ammonia rich urea into the exhaust gas mixture entering the catalyst, are known to achieve high NOx conversion efficiency.

The reductant, which may be ammonia rich urea, is an aqueous solution which is stored in a reductant reservoir in the vehicle. The fluid is delivered to an injector, in communication with the exhaust system of the vehicle, via fluid lines and a pump. The urea solution typically has a freezing temperature in the range of 12 degrees Fahrenheit, which may present winter challenges to the operation of the SCR system. The system herein described includes a reservoir which, in an exemplary embodiment includes an in-tank, or partially submersible reductant pump assembly having a heating element associated therewith. The heating element operates to heat the liquid in the reservoir to avoid freezing, or to thaw frozen reductant during cold weather operation. Also associated with the pump assembly is a fluid sprayer which operates to draw fluid over the heating element and disperse the fluid through nozzles exiting from the exterior of the pump. The fluid spray disperses heated fluid throughout the reservoir resulting in circulation of the fluid into colder regions which are otherwise unaffected by the heating element. The result is more efficient thawing of the reductant.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
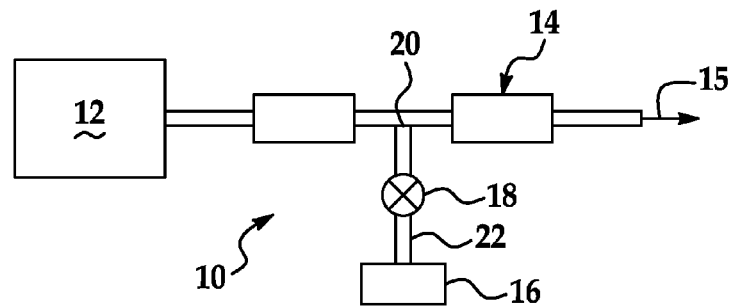
FIG. 1 is a schematic view of an emission control system for an internal combustion engine, which embodies features of the present invention.
Figure 2:
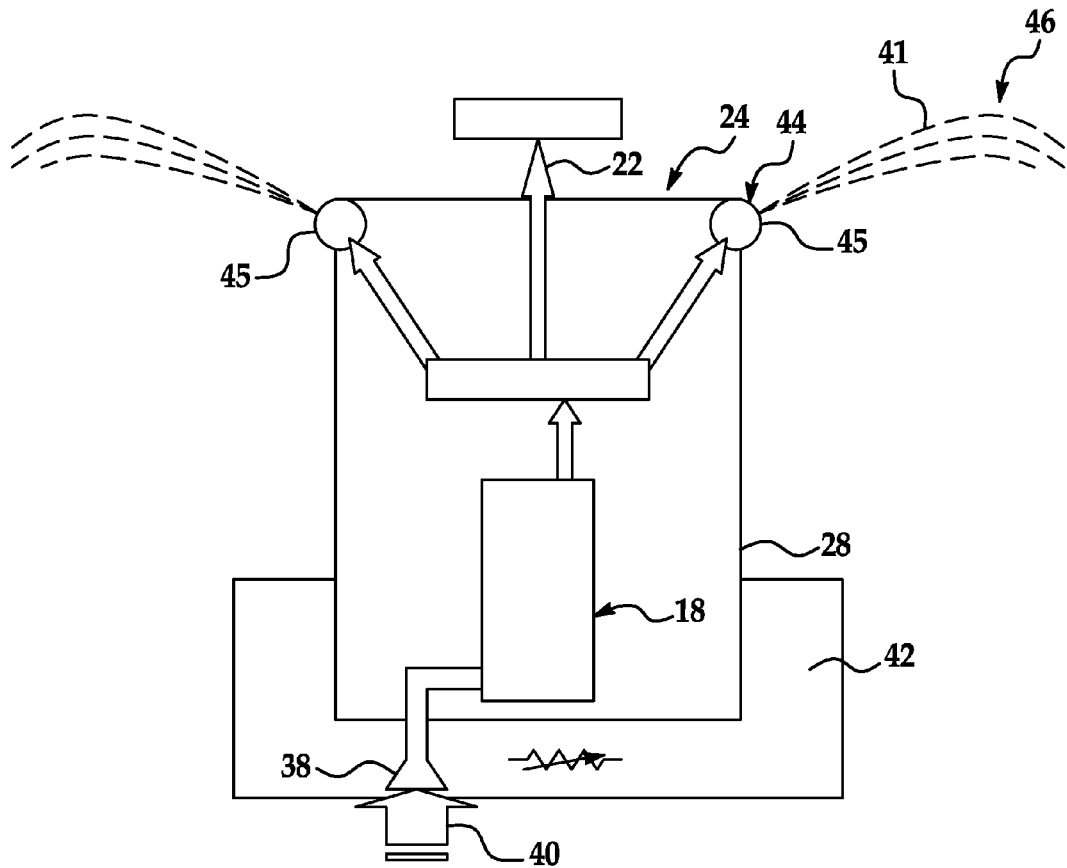
FIG. 2 is a sectional view through a reductant reservoir of the emission control system of FIG. 1.
Figure 3:
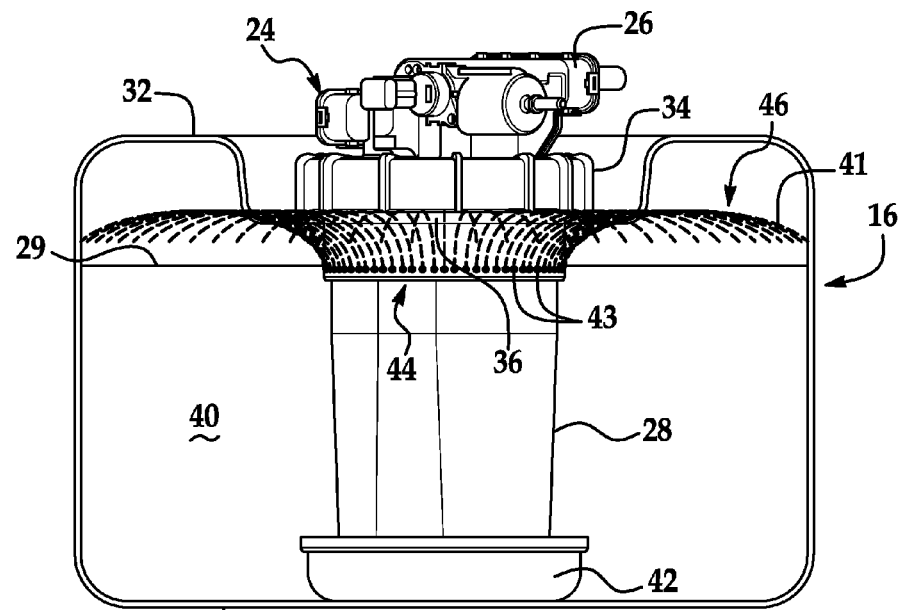
FIG. 3 is a top view of the reductant reservoir of the emission control system of FIG. 1 with a reductant spray pattern illustrated thereon

Illustrated in FIG. 1, an emission control system 10 for diesel and other lean-burn engines 12, commonly used in motor vehicle applications, is shown. The emission control system includes a Selective Catalytic Reduction (SCR) catalyst 14, in which the NOx component of the engine exhaust gas is continuously reduced to nitrogen ($N_2$) over a catalyst typically composed of base metals, through active injection of a reductant, such as ammonia rich urea, into the exhaust gas mixture entering the catalyst. The reductant is stored in a reductant reservoir 16, FIGS. 2 and 3, and is delivered by pump 18 to an injector 20 located upstream of the SCR catalyst 14 through fluid line 22.

In an exemplary embodiment of the invention the reductant reservoir 16 includes an in-tank, or partially submersible reductant pump assembly 24 having a delivery module 26 associated with a fluid uptake or base 28 which extends axially from a location adjacent to the bottom 30 of the reservoir 16 to the top 32 thereof. The base 28 includes an annular mounting ring 34 which secures the pump assembly 24 to the reservoir through engagement with opening 36 in reservoir top 32. A reductant intake 38 is located in base 28 preferably adjacent to the bottom 30 of the tank to assure efficient scavenging of the reductant 40. The reductant 40 which may be an aqueous urea formulation typically has a freezing temperature in the range of 12 degrees Fahrenheit. A heating element 42 is associated with the pump assembly 24 and operates to warm and/or thaw the reductant 40 during cold weather operation of the vehicle. In a preferred embodiment, the heating element 42 is associated with the base 28, FIG. 2, and heats the reductant drawn into the pump assembly through reductant intake 38. The heating element 42 may also heat the base 28 resulting in localized heating of the reductant 40 surrounding the base.

Also associated with the pump assembly is a fluid spray assembly including, in an exemplary embodiment, a nozzle spray ring 44. The spray ring 44 is disposed about the upper portion of the base 28 near the upper fluid level 29 of the reductant, and is operated in association with the pump 18 and the heating element 42 to spray heated, liquid reductant 41, through one or more nozzles 43, about the interior of the reductant reservoir in a spray pattern 46 which is configured to move heated fluid within the reservoir radially outwardly from the centrally located pump assembly 24 to the outer regions of the reservoir to warm and/or thaw reductant throughout the reservoir using the heat generated by the heating element 42. The fluid spray disperses heated fluid throughout the reservoir resulting in heat transfer from the warmer fluid into colder regions which are otherwise unaffected by the heating element. The result is more efficient thawing of the reductant. It may be desirable to augment the heat delivered to the already heated fuel in order to improve the warm/thaw capability of the present invention. In such an instance it is contemplated that the nozzle spray ring may also include a supplemental heating element operable to further heat the fluid exiting the nozzle spray ring 44.

Figure 4:
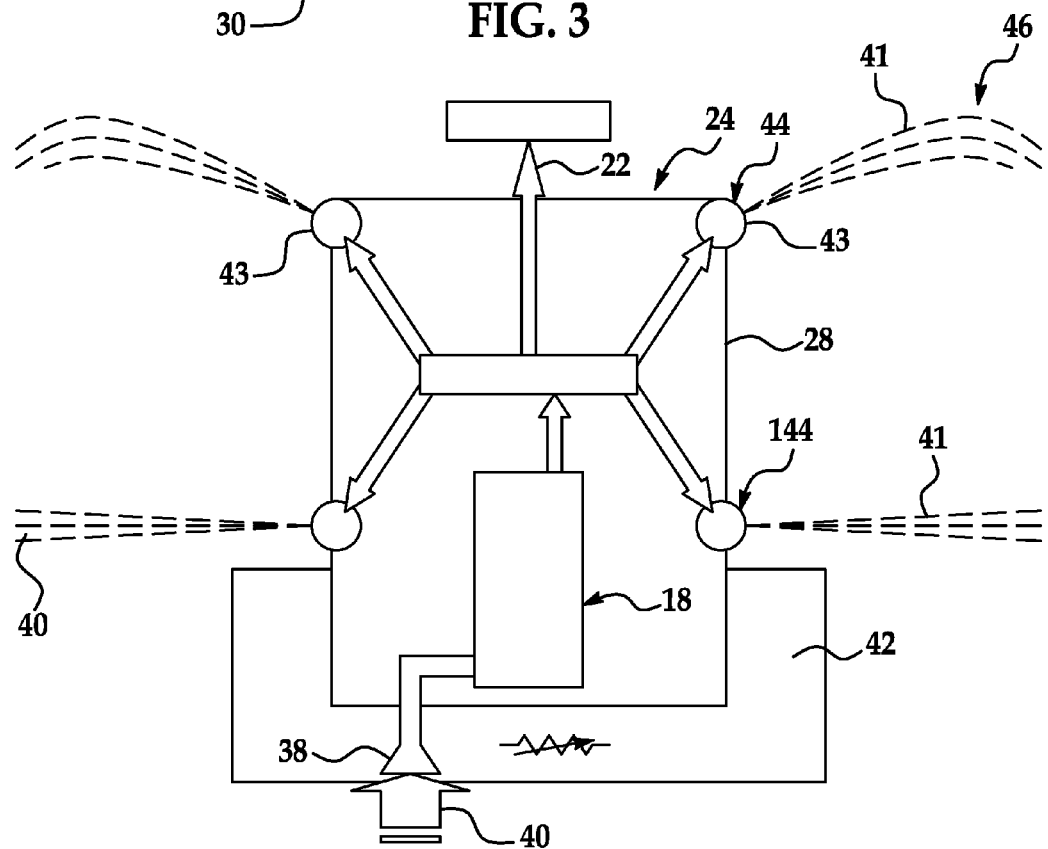
FIG. 4 is a sectional view through a second embodiment of the reductant reservoir of the emission control system of FIG. 1.
Figure 5:
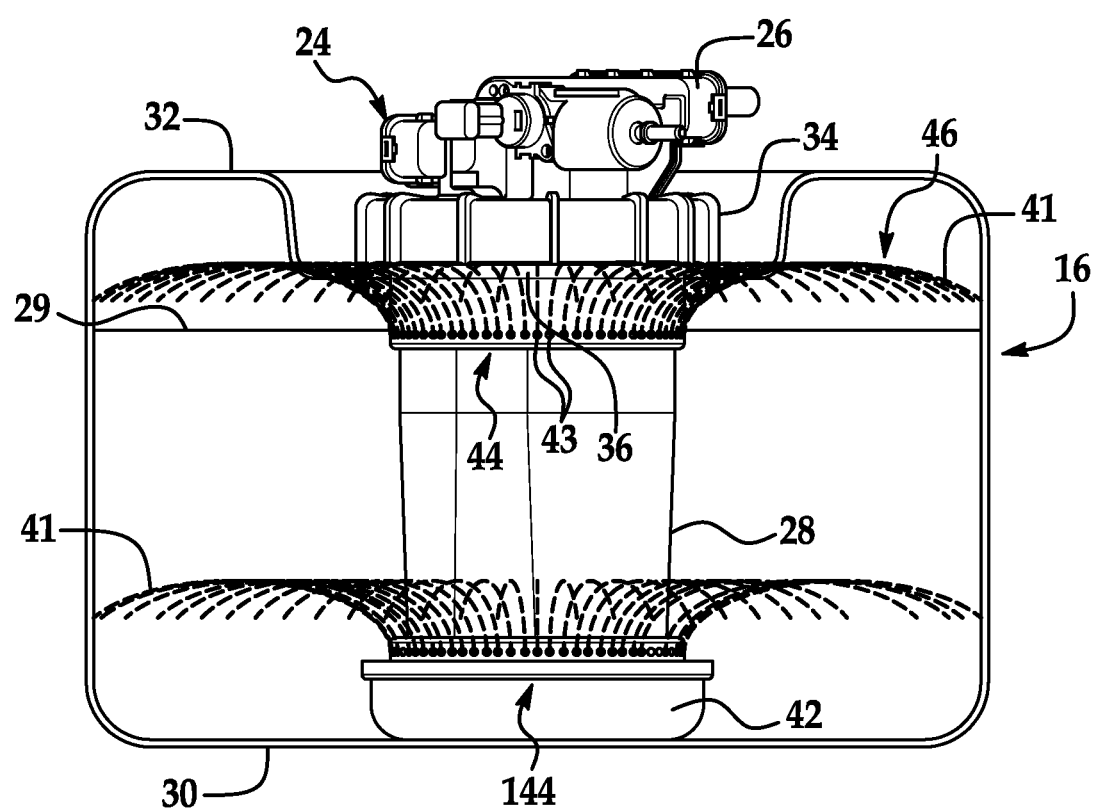
FIG. 5 is a schematic, sectional view of the pump assembly of the reductant reservoir of FIGS. 2-4.

In another exemplary embodiment of the invention illustrated in FIGS. 4 and 5, in which like elements of the invention are illustrated with the same numbers as already described, a fluid circulation assembly has a nozzle circulation ring 144 disposed about the circumference of the base 28, below the upper fluid level 29 of the reservoir 16. The circulation ring 144 may be disposed at any location axially along the base 28 and is preferably located adjacent to the reductant intake 38. The circulation ring is operated in association with the pump 18 and the heating element 42 to inject heated, liquid reductant 41 into the reductant to establish fluid circulation which operates to move heated fluid within the reservoir radially outwardly from the centrally located pump assembly 24 to the outer regions of the reservoir to warm and/or thaw reductant throughout the reservoir using the heat generated by the heating element 42. The fluid circulation disperses heated fluid throughout the reservoir resulting in heat transfer from the warmer fluid into colder regions which are otherwise unaffected by the heating element. The result is more efficient thawing of the reductant. It may be desirable to augment the heat delivered to the already heated fuel in order to improve the warm/thaw capability of the present invention. In such an instance it is contemplated that the nozzle spray ring may also include a supplemental heating element operable to further heat the fluid exiting the nozzle spray ring 144.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A reductant reservoir for an emission control system comprising;
   a pump assembly having an intake adapted to withdraw reductant from the reductant reservoir into a first flow path formed in the pump assembly;
   a heating element associated with the pump assembly for heating the reductant withdrawn from the reductant reservoir through the intake, thereby providing heated reductant;
   an outlet formed in the pump assembly for delivering a first portion of the heated reductant from the first flow path to the emission control system; and
   a nozzle assembly fluidly connected to the first flow path formed in the pump assembly, the nozzle assembly adapted to eject a second portion of the heated reductant from the first flow path into the reductant reservoir.

2. The reductant reservoir of claim 1, wherein;
   the nozzle assembly is located proximate to an upper fluid level of the reductant and is operable to establish a spray pattern above a surface of the reductant to disperse heated fluid throughout the reductant reservoir.

3. The reductant reservoir of claim 1, wherein;
   the nozzle assembly is proximate to a bottom of the reservoir and is operable to establish fluid circulation of the reductant to disperse heated fluid throughout the reductant reservoir.

4. The reductant reservoir of claim 1, wherein;
   the nozzle assembly has a second heating element operable to further heat the reductant ejected therefrom.

5. An emission control system for an internal combustion engine comprising;
   a selective catalytic reduction catalyst operable to reduce a NOx component of exhaust gas of the internal combustion engine; and
   a reductant reservoir associated with said emission control system and having a pump assembly, an intake adapted to withdraw reductant from said reductant reservoir, a first flow path formed in the pump assembly, a heating element associated with said pump assembly for heating said reductant withdrawn from the reductant reservoir through the intake, thereby providing heated reductant, an outlet formed in the pump assembly for delivering a first portion of said heated reductant to said emission control system from the first flow path, and a nozzle assembly adapted to eject a second portion of the heated reductant into the reductant reservoir from the first flow path.

6. The emission control system of claim 5, further comprising;
   a reductant injector in communication with the outlet to receive the reductant therefrom for delivery to said selective catalytic reduction catalyst.

7. The emission control system of claim 5, wherein;
   the nozzle assembly is located proximate to an upper fluid level of the reductant and is operable to establish a spray pattern above a surface of the reductant to disperse heated fluid throughout the reductant reservoir.

8. The emission control system of claim 5, wherein;
   the nozzle assembly is located proximate to a bottom of the reductant reservoir and is operable to establish fluid circulation of the reductant to disperse heated fluid throughout the reductant reservoir.

9. The emission control system of claim 5, wherein;
   the nozzle assembly has a second heating element operable to further heat the reductant ejected there from.

* * * * *